Sept. 17, 1935.  H. J. ZIEMAN  2,014,420
LEVEL
Filed July 13, 1929   2 Sheets-Sheet 1
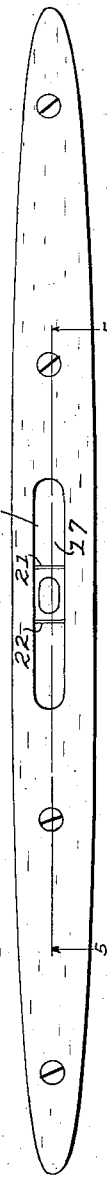
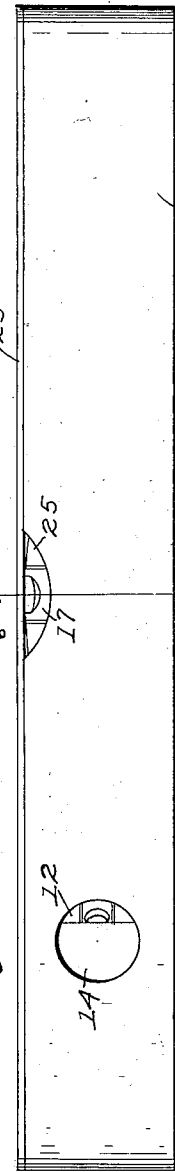
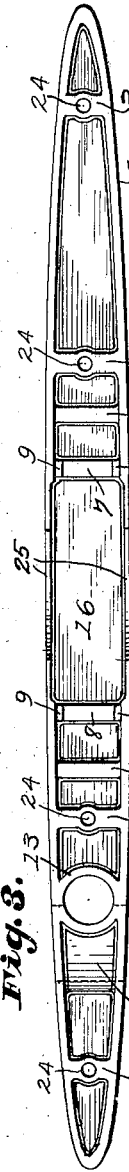
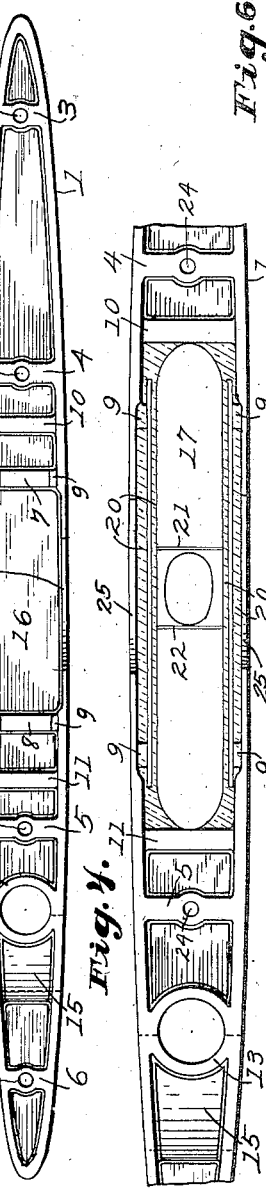
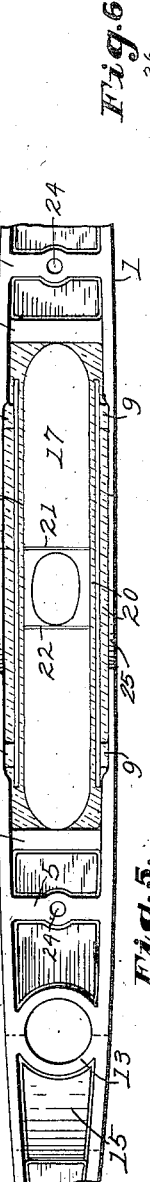
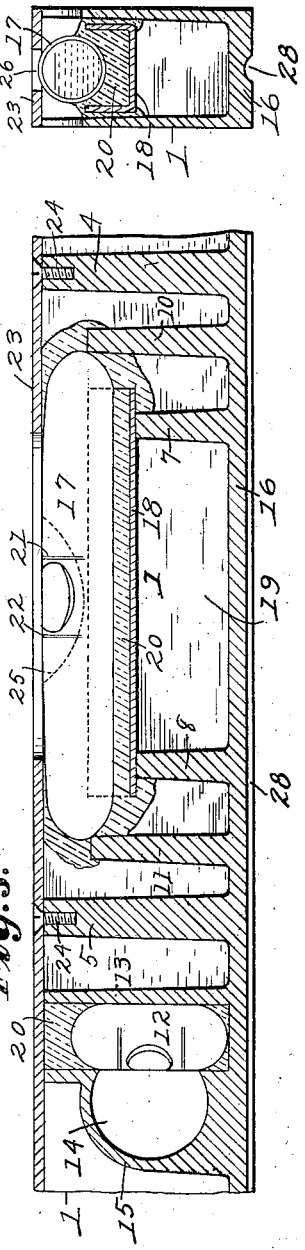
INVENTOR.
Harry John Zieman
BY
Wheeler, Wheeler & Wheeler
ATTORNEYS.

Sept. 17, 1935. H. J. ZIEMAN 2,014,420
LEVEL
Filed July 13, 1929 2 Sheets-Sheet 2
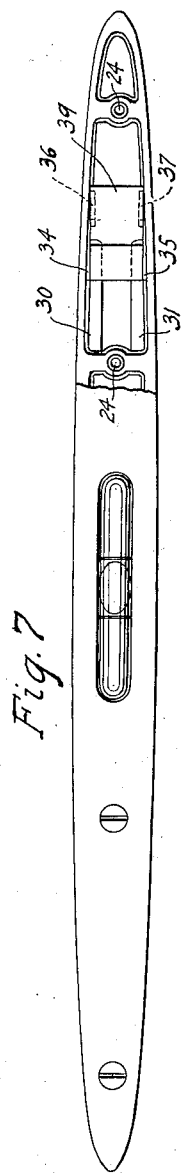
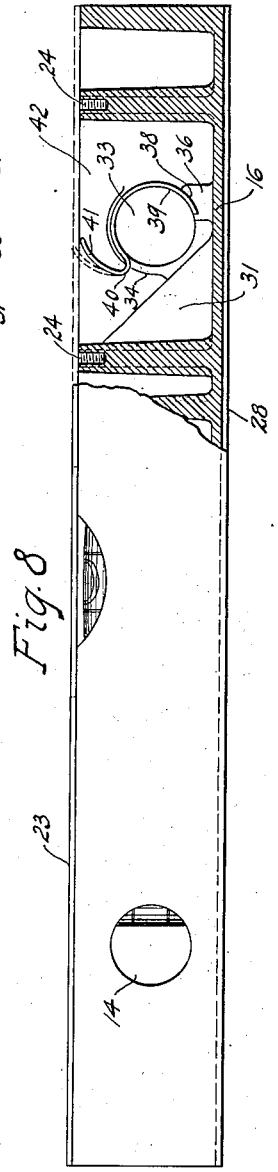
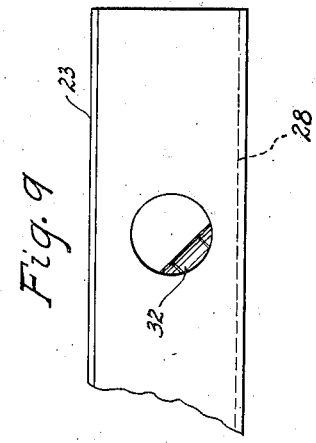
INVENTOR.
Harry John Zieman
BY
Wheeler, Wheeler & Wheeler
ATTORNEYS Patented Sept. 17, 1935

2,014,420

UNITED STATES PATENT OFFICE 2,014,420

LEVEL

Harry John Zieman, Milwaukee, Wis.

Application July 13, 1929, Serial No. 378,112

10 Claims. (Cl. 33—211)

My invention relates to improvements in levels.

The object of my invention is to provide a level which may be easily manufactured at a reasonable cost.

More particularly stated, it is an object of my invention to provide a level, the body of which may be formed as a die casting in such shape as to permit of installation of level vials by persons unskilled in the art.

Another object of my invention is to provide a level with an angularly disposed vial whereby to test for accuracy of position of articles which are not in a true horizontal or perpendicular position and it is a further object of my invention in connection with this angularly disposed vial to provide a construction which will permit of the same ease and cheapness of manufacture which is made possible by the same construction of the other parts of my level.

A further object of my invention is to provide a level which may be easily carried in a vest or coat pocket without discomfort to the wearer.

In the drawings:

Figure 1 is a top view of my complete level.

Figure 2 is a side view of the same level shown in Figure 1.

Figure 3 is a top view of the die casting which forms the body of my level.

Figure 4 is a view of the central part of the body of my level showing a vial in place.

Figure 5 is a section on line 5—5 of Figure 1.

Figure 6 is a section on line 6—6 of Figure 2.

Figure 7 is a plan view of my level with an angularly disposed vial support.

Figure 8 is a side elevation of the same level shown in Figure 7 with a portion of the side wall cut away to show the angularly disposed vial support.

Figure 9 is a detail side elevation of the same level shown in Figure 8 with an angularly disposed vial in position.

Like parts are identified by the same reference characters throughout the several views.

As stated above it is an object of my invention to provide a metallic level which may be easily and comfortably carried in a coat pocket and it is therefore of importance that the metallic body be made as light as possible. It is also of importance that the complete level offer no sharp corners or projections at its extremities so as to prod the body of a person carrying my level in a coat pocket, particularly if such pocket is the inside pocket in a coat. I have therefore provided a metallic body 1 for my level which comprises merely a shell with certain bosses and cross members to reinforce the shell and to support the vials as hereinafter described, and in furtherance of the comfort of the carrier of my device, I have narrowed the ends of the shell-like body of my device and therefore it may be said to be stream-lined in shape.

In forming the shell-like body of my level, it has been necessary, as stated above, to form the walls very thinly and therefore to provide reinforcement at various points in the length of the body by means of partitions or reinforcing walls 3, 4, 5 and 6 which extend from side to side and completely from top to bottom and which are narrower or thinner at the top than they are at the bottom.

In addition to those partition walls, I have provided supports 7 and 8 which do not extend completely to the top of the level body 1 and which are provided with marginal upward extensions 9 on either side. These comprise bosses which assist in the placing of a vial in the assembly of my complete level. Between these supporting partitions 7 and 8 and the partitions 4 and 5, I have provided retaining walls 10 and 11 similar to the partitions 4 and 5 with the exception of their height which is somewhat less than that of the partitions 4 and 5 for reasons hereinafter to be stated.

If my level were only to be used to determine correctness of position in relation to the true horizontal, the body of my improved level would need no further internal members. However, I have provided a vial 12 which is used to determine correctness of position vertically and I have therefore provided for this vial a substantially tubular receptacle 13 which is intersected by a walled aperture 14 extending through the body of my level from side to side as indicated most clearly in Figure 5. The walled aperture, constituting a sight for the vial 12, is formed in what may be termed a boss 15 extending upwardly from the floor or bottom of the body of my level.

It will be noted as to each of the various elements forming cross members within the shell of the body 1 of my level that they taper from a broad base to a narrow top portion and as to the boss 15, this likewise is larger at the bottom than at the top, with the result that my entire shell body and said cross members may be easily made as a die casting providing a floor 16 and side walls as indicated. The aperture 14 constituting a sight for the vial 12, may be drilled, punched or die cast in any approved manner.

The body of my level having been formed as described above, the vial 12 and a vial 17 for determining horizontal correctness of horizontal position, may be installed within the body by placing a quantity of plastic cementitious material into the spaces reserved for these vials, and since the receptacle or space within which the vial 17 is to rest would require a substantial quantity of plastic material, in fact somewhat in excess of the real necessity for securing merely the vial itself, I have provided a false floor 18 to rest upon the supporting partitions 7 and 8 between the extensions 9 so that the plastic material may be prevented from descending into the space 19 and will be supported adjacent the top of the shell body to receive the vial 17.

Presupposing that the level has been positioned upon a truly horizontal surface, any person, whether skilled in the art or not, can easily place the vial into the plastic material supported by the false floor 18 and so place the vial as to correctly indicate the true horizontal in relation to the floor or base of my level body. More assistance is lent to this operation in the assembly of my level because of the fact that the upward extensions 9 of the supporting partitions 7 and 8 are spaced apart enough to permit the reception of a vial of the proper size for my level and since it is of importance that the vial be placed in the plastic material 20 parallel with the true axis of the body of my level, these extensions are of great importance.

In placing the vial 12, plastic material is supplied to the interior of the tube 13 and the vial is pressed into the plastic mass so as to position the sight of the vial within the aperture 14, only sufficient play between the vial 12 and the interior of the tube 13 being provided to permit of adjustment in a limited sense, since the tube 13 may be quite accurately die cast to establish its axis normally to the plane of the floor 16.

When the two vials have been cemented into position, a cover 23 shaped in conformity with the top of my level may then be secured to the said body by means of screws extending into threaded apertures 24 formed in the top of each of the partitions 3, 4, 5 and 6 and, since I have provided crescent-shaped sight holes 25 in the die casting operation and a sight aperture 26 in the cover 23, my level is then complete.

A groove 28 is provided so that the entire level may be placed upon any curved surface and assume a position from which it may not easily be dislodged and in which it is most nearly likely to be parallel with the axis of its supporting surface. For instance, when it is placed upon a pipe or a rod, it will be found that this groove will assist greatly where the horizontal position of such an article is to be ascertained. A substantial jar or push is necessary to dislodge my level from its position upon a curved surface.

In some specialized lines of work a vial set in a level at a particular angle, for instance at an angle of 45°, is a necessary tool for workmen engaged therein. I have therefore provided as shown in Figures 7 to 9, inclusive for the formation of a particular vial receiving construction for angularly disposed vials.

In providing a rest for a vial in this position the same problem of axially aligning the vial with the main body of the level is important and I have therefore provided spaced bosses 30 and 31, the upper faces of which are disposed at an angle of 45° to the floor 16 of my level. These bosses are spaced apart so that a vial 32 supported between them will assume a linear position axially parallel with the axis of the body of the level and will also be positioned at the proper angle to position the level indicating bubble of the vial within the sight 33 when the level is in a position 45° from true horizontal position.

This vial is likewise set in a plastic cementitious material in a manner similar to that described above with reference to the horizontal and vertical level vials.

New problems presented by the construction of an angularly disposed vial arise in the construction of a level by the die-cast method described above since the sight at 33 cannot be constructed identically with sight 14. Room must be provided for the placing of the vial after the die-cast process is completed.

I therefore provide at either side of the sight hole 33 bosses 34—35 which have parallel inner surfaces and which merge at their lower extremity in slotted bosses 36—37, the slot 38 being provided for the reception of a clip 39 which is curved to coincide with the opening of the sight hole 33 and which at 40 is curved reversely away from the space occupied by the vial,—a terminal for the clip at 41 being provided to be pressed down by the top 23 when it is held in position by screws 24.

The clip 39, being of the exact width between the spaced bosses 36 and 37, completely closes the opening from the sight hole into a cavity 42 left by the die-cast process.

With this construction it is possible with unskilled labor to place an angularly disposed vial in a level such as that described above and shown in Figures 1 to 5, inclusive and still maintain the same cheapness of construction and accuracy of completed article as is obtainable through the construction described with reference to the horizontal and vertical levels.

I claim:

1. The combination with a hollow level body having a sight hole therein, and provided with a floor, of spaced bosses angularly disposed with reference to the floor within the hollow body, a level vial mounted between said spaced bosses, slotted spaced bosses about the sight hole in the level body and a clip between the bosses having its edges disposed in the slots of said spaced bosses whereby to close the space between said slotted spaced bosses.

2. The combination of a hollow level body having a sight hole therein, and provided with a floor and a removable top, of spaced bosses angularly disposed with reference to the floor, the upper margins of said bosses being accurately disposed parallel to the vertical longitudinal axial plane of the body of the level, a level vial mounted upon said parallel margins, spaced slotted bosses comprising marginal reenforcement of the sight hole in the level body adjacent said vial and a spring clip closing the space between said marginal reinforcing bosses and having its edges disposed in the slots thereof, said clip being provided with a reverse curve adapted to be pressed by the top of the level whereby to cause said clip to conform to the margins of the aperture.

3. A level comprising an integral hollow body open at the top, a bottom, side walls, and transverse webs connecting said walls and providing chambers therebetween, certain of said webs being disposed with their upper margins at an intermediate height between said walls to comprise supports for a vial, a vial supported from said margins and other webs disposed closely adjacent thereto at a greater height and confining the ends of said vial.

4. A level including the combination with a thin cover and a level glass beneath said cover, of a hollow one piece level body enclosing said glass and supporting said cover, said body comprising integral bottom and side walls and longitudinally spaced transverse webs connecting said walls, said walls and certain of said webs terminating in a common plane for the support of said cover and contoured to correspond with said cover, others of said transverse webs comprising supports for said level glass, and said body and cover providing sight means through which said glass is visible, together with means releasably fastening said cover to said certain transverse webs.

5. A level comprising the combination with a cover plate provided with a sight opening, of a hollow one piece level body comprising a bottom, side walls, and a series of transverse webs connecting said walls at intervals throughout their length, said walls and certain of said webs being arranged to terminate in a common plane to receive and support said cover and others of said webs being extended at least as high as the middle of said walls to support a level vial immediately beneath said cover, still others of said webs comprising means for centering such a vial beneath the sight opening of said cover, together with a vial positioned upon and by said webs and provided with means for fixing its position, and means for holding the cover in position upon its supporting walls and webs.

6. A level comprising a hollow one piece frame having integrally connected bottom and side walls gradually and continuously converging at a progressively increasing rate from the intermediate portions of the frame to sharply rounded apices at the ends of the frame, together with vial positioning webs integral with said walls and bottom, top supporting webs integral with said walls and bottom and provided with threaded apertures, a vial carried by the vial supporting webs, and a top plate conforming in outline to said walls and resting thereon and on said top supporting webs and anchored by screws in said apertures.

7. A level including a hollow unitary body open at one side, reenforcing partitions across the interior of the body, spaced bosses formed integral with the body adjacent the partitions and shaped to receive a vial and position it parallel with the axis of the body of the level, and a vial disposed upon said bosses, and embedded in cementitious material, and a closure for said open side of said body.

8. A level comprising an elongated unitary hollow body open at the top, a closure for said top forming a compartment within the body, integral low partitions between the side walls of the body, a false floor supported upon the partitions, a mass of cementitious material supported by said false floor and a vial secured in the cementitious material.

9. A level frame comprising a hollow body having a bottom and integral side walls with a relatively wide and stable intermediate portion, the sides of said body being continuously curved converging gradually and symmetrically from said wide intermediate portion to relatively sharply rounded apices at its respective ends, the walls of said body having smooth exterior surfaces substantially parallel in a vertical direction at all points and joined across the hollow interior of said body at intervals by integral partitions, the thickness of said walls and partitions being increased from the top to the bottom of said body, all of said increase, however, being disposed in the interior of said frame.

10. In a level, the combination of a hollow unitary body open at its top, and comprising integrally a base and side walls, vial supporting means extending upwardly from said base and integrally joined with said side walls, a vial disposed upon said means and a cementitious material mounted on said means and partially imbedding said vial, and a closure for said open top of said body.

HARRY JOHN ZIEMAN.